(12) United States Patent
Klier et al.

(10) Patent No.: US 10,036,575 B2
(45) Date of Patent: Jul. 31, 2018

(54) SOLAR THERMAL COLLECTING SYSTEM

(75) Inventors: Shimon Klier, Savyon (IL); Michael Adel, Zichron Ya'akov (IL)

(73) Assignee: TIGI LTD., Neve Yarak (IL)

( * ) Notice: Subject to any disclaimer, the term of this patent is extended or adjusted under 35 U.S.C. 154(b) by 406 days.

(21) Appl. No.: 13/143,201

(22) PCT Filed: Jan. 18, 2010

(86) PCT No.: PCT/IB2010/050212
§ 371 (c)(1),
(2), (4) Date: Jul. 5, 2011

(87) PCT Pub. No.: WO2010/082181
PCT Pub. Date: Jul. 22, 2010

(65) Prior Publication Data
US 2011/0265785 A1    Nov. 3, 2011

Related U.S. Application Data

(60) Provisional application No. 61/145,557, filed on Jan. 18, 2009.

(51) Int. Cl.
*F24J 2/34* (2006.01)
*F24J 2/50* (2006.01)
(Continued)

(52) U.S. Cl.
CPC .............. *F24J 2/34* (2013.01); *F24J 2/4636* (2013.01); *F24J 2/505* (2013.01); *F24J 2/507* (2013.01);
(Continued)

(58) Field of Classification Search
CPC .............. F24J 2/34; F24J 2/4626; F24J 2/515
(Continued)

(56) References Cited

U.S. PATENT DOCUMENTS 3,923,038 A * 12/1975 Cutchaw ................. 126/616
3,974,822 A *  8/1976 Patil ..................... F24J 2/4612
126/634
(Continued)

FOREIGN PATENT DOCUMENTS

GB    2259732 A *  3/1993 ............... E06B 3/66

*Primary Examiner* — Steven B McAllister
*Assistant Examiner* — Desmond C Peyton
(74) *Attorney, Agent, or Firm* — Mark M. Friedman

(57) ABSTRACT

It is provided a solar energy module for converting solar radiation to thermal energy. The module includes a thermally insulating element transmissive to solar radiation and having low transmissivity to thermal infra-red radiation, an absorbing element, a sealed enclosure, and a variable portion in the envelope of the sealed enclosure. This portion is adapted for varying the volume available to gas enclosed in the enclosure in accordance with changing temperature of the enclosed gas. Also, it is provided a solar energy module which includes a thermally insulating element, an absorbing surface and liquid pipes for absorbing the solar radiation, and an air duct thermally coupled thereof. The heated liquid and the heated air are usable for a variety of thermal applications. A heat storage may be thermally coupled to the absorbing surface and to the liquid pipes. The air duct has several air valves, and is associated with a controller for regulating air flow through the air duct. The controller may regulate heat flow in accordance with an optimization program, receiving inputs from several sources, like a sensor monitoring a building, a sensor monitoring the solar energy module, and an environment sensor.

6 Claims, 10 Drawing Sheets

(51) Int. Cl.
*F24J 2/51* (2006.01)
*F24J 2/46* (2006.01)

(52) U.S. Cl.
CPC ............... *F24J 2/515* (2013.01); *Y02B 10/20* (2013.01); *Y02E 10/40* (2013.01); *Y02P 90/50* (2015.11)

(58) Field of Classification Search
USPC ....... 126/561, 567, 568, 599, 616, 625, 661, 126/904, 624, 627, 711, 626, 628, 594
See application file for complete search history.

(56) References Cited

U.S. PATENT DOCUMENTS

| | | | | |
|---|---|---|---|---|
| 4,015,586 | A * | 4/1977 | Vroom | F24J 2/265 126/587 |
| 4,048,980 | A * | 9/1977 | Googin et al. | 126/661 |
| 4,096,861 | A * | 6/1978 | Bowles | F24D 17/0068 126/586 |
| 4,102,325 | A * | 7/1978 | Cummings | 126/585 |
| 4,138,991 | A * | 2/1979 | Lorenz | F24J 2/204 126/709 |
| 4,203,421 | A | 5/1980 | Bencic | |
| 4,215,675 | A * | 8/1980 | Embree | F24J 2/045 126/623 |
| 4,243,022 | A * | 1/1981 | Pedone | 126/675 |
| 4,244,356 | A * | 1/1981 | Barrett | 126/622 |
| 4,248,212 | A * | 2/1981 | Stevens | 126/629 |
| 4,297,990 | A * | 11/1981 | Allisbaugh | 126/667 |
| 4,353,412 | A | 10/1982 | Krumhansl | |
| 4,404,958 | A * | 9/1983 | Boettcher | 126/625 |
| 4,438,759 | A * | 3/1984 | Kitajima | F24J 2/16 126/635 |
| 4,446,853 | A * | 5/1984 | Adcock | F24F 5/0046 126/652 |
| 4,480,632 | A | 11/1984 | Klier | |
| 4,569,330 | A * | 2/1986 | Pettersson | F24J 2/4612 126/570 |
| 4,674,476 | A * | 6/1987 | Wilson | 126/591 |
| 4,719,902 | A | 1/1988 | Klier | |
| 4,803,972 | A * | 2/1989 | Janson | F24J 2/4643 126/710 |
| 4,815,442 | A | 3/1989 | Klier | |
| 4,928,665 | A | 5/1990 | Klier | |
| 5,167,217 | A | 12/1992 | Klier | |
| 5,255,666 | A * | 10/1993 | Curchod | 126/569 |
| 5,794,611 | A * | 8/1998 | Bottum, Jr. | F24D 17/0021 126/658 |
| 5,931,157 | A * | 8/1999 | Aschauer | 126/650 |
| 7,077,124 | B2 | 7/2006 | Szymocha | |
| 8,857,426 | B2 * | 10/2014 | Klier et al. | 126/643 |
| 2006/0107944 | A1 * | 5/2006 | Bourke | F24D 17/0021 126/599 |
| 2012/0291770 | A1 * | 11/2012 | Klier et al. | 126/643 |
| 2014/0166044 | A1 * | 6/2014 | Klier et al. | 134/1 |

* cited by examiner

SOLAR THERMAL COLLECTING SYSTEM

BACKGROUND OF THE INVENTION

Field of the Invention

The invention is in the field of solar energy, and in particular deals with solar energy modules with pressure controlled gas enclosures, controlled air duct, and means for distributing solar energy to a variety of building applications.

Description of Related Art

Thermally insulating panel transmissive to solar radiation, while having low transmissivity to thermal infra-red radiation, had been disclosed in U.S. Pat. Nos. 4,480,632, 4,719,902, 4,815,442, 4,928,665 and 5,167,217 all to Klier and Novik. The thermally insulating panel, also called transparent insulation material or thermal diode may be a honeycomb made of synthetic material or glass which is transparent to solar IR and visible wavelength, and opaque to thermal IR back-radiation, as a result of the optical properties of the material and its geometry. At the same time the transparent insulation material is a thermal convection suppressor because of its geometry and a thermal conduction suppressor as a result of the thermal properties of the material and the thin walls of the honeycomb. This imbalance of the transparency to incoming solar radiation, the thermal-IR back-radiation and the restricted energy losses due to low convection and conduction create a thermal diode and enable the capturing and use of that captured heat for a variety of energy applications.

The use of thermal insulation panels enables much greater energy conversion efficiencies over a much broader range of ambient temperatures and conditions, especially in colder climates. However, in order to extend the lifetime and guarantee the performance of the solar module, it is necessary to seal it and isolate the internal components, such as the transparent insulation panel itself from the ambient atmosphere, eliminating the risk of condensation or residual chemical contamination. Sealed enclosure also enables replacement of the ambient gas within the unit with a medium of superior thermal characteristics, lower conduction and convection, such as those of the noble gases Argon and Krypton. The sealing of the insulative panel however, creates new challenges, related to pressure build up and the risk of catastrophic breakdown of the gas enclosure. This risk is exacerbated by the increased volume of the solar panel due to the inclusion of transparent insulating panel, together with the wider range of temperature fluctuation enabled by the transparent insulation.

Thus, it may be desirable to control the parameters of the enclosed gas. Also, it may be desirable to control the heat flow from the solar module to a variety of applications.

BRIEF SUMMARY OF THE INVENTION

It is provided according to some embodiments of the present invention a solar energy module for converting solar light to thermal energy. The module includes a thermally insulating element transmissive to solar radiation and having low transmissivity to thermal infra-red radiation, an absorbing element for absorbing the solar radiation, a sealed enclosure associated with the absorbing element, and a variable portion in the envelope of the sealed enclosure. This portion is adapted for varying the volume available to gas enclosed in the enclosure in accordance with changing temperature of the enclosed gas. Solar radiation penetrates the thermally insulating element and is absorbed by the absorbing element. As a result, the enclosed gas is heated and the variable portion varies to increase the available volume. Thus pressure of enclosed gas is kept within structurally tolerable limits and can in principle enable pressure equilibration with the external environment.

In some embodiments, the variable portion is a stretchable sealing element connecting the thermally insulating element and the absorbing element. Stretching of the stretchable sealing element increases the volume available for the enclosed gas, compensating for thermally induced pressure fluctuations.

In some embodiments, the sealed gas enclosure includes a fixed volume element, an expandable compartment, and a connecting duct in between. Upon heating of the gas enclosed in the fixed volume element, gas flows from the fixed volume element to the expandable compartment, keeping pressure of enclosed gas within structurally tolerable limits.

In some embodiments, a flexible compartment having a venting outlet is enclosed within the sealed gas enclosure, such that the external envelope of the flexible compartment is a variable portion of the internal envelope of the sealed gas enclosure. Upon warming up of the enclosed gas, gas pressure increases and induces reduction of the volume enclosed by the flexible compartment. Thus, gas emits out of the flexible compartment through the venting outlet, the volume available for the enclosed gas increases and gas pressure is kept within structurally tolerable limits.

In some embodiments, the thermally insulating element includes structural component having high transmissivity to solar radiation and low transmissivity to infra-red thermal radiation. Exemplary structural components are an insulation which includes several transparent enclosures, a layer of insulative beads disposed within an enclosure, and an array of elongated cells.

It is provided according to some embodiments of the present invention a solar energy module for converting solar radiation to thermal energy. The module includes a thermally insulating element transmissive to solar radiation and having low transmissivity to thermal infra-red radiation, an absorbing surface and liquid pipes for absorbing the solar radiation transmitted by the thermally insulating element, and an air duct thermally coupled to the absorbing surface and to the liquid pipes. The thermally insulating element includes structural component having high transmissivity to solar radiation and low transmissivity to infra-red thermal radiation. Solar radiation penetrates the thermally insulating element and is absorbed by the absorbing surface, which in turn heats liquid within the liquid pipes, and air flowing in the air duct. The heated liquid and the heated air are usable for a variety of thermal applications.

In some embodiments, a heat storage element is thermally coupled to the absorbing surface and to the liquid pipes.

In some embodiments, heat produced by the solar energy module is thermally coupled to a wall of a building, thereby warming up the wall, which in turn transfers heat to the inside of the building.

In some embodiments, the air duct has two or more air valves, and is associated with a controller for regulating air flow through the air duct. The controller may regulate heat flow from the solar energy module in accordance with an optimization program. The optimization program receives inputs from several sources. Exemplary sources are a sensor monitoring a parameter of a building, a sensor monitoring a parameter of the solar energy module, an environment sensor and human input.

It is provided according to some embodiments of the present invention a method for providing heat to a building using hot air and hot water from solar energy modules providing heat to several heating means. The heating means includes air duct and heat reservoir. The flow of heat from the heating means is regulated by one or more control means. The method includes monitoring temperature in one or more locations within the building, external temperature, monitoring temperature of the heating means, designing heating plan in accordance with monitored temperatures and in accordance with heat optimization targets and commanding the control means for application of the heating plan.

BRIEF DESCRIPTION OF THE DRAWINGS

The subject matter regarded as the invention is particularly pointed out and distinctly claimed in the concluding portion of the specification. The invention, however, both as to system organization and method of operation, together with features and advantages thereof, may best be understood by reference to the following detailed description when read with the accompanied drawings in which:

FIG. 2 is a schematic drawing of a solar energy module having a fixed volume element, an expandable compartment, and a connecting duct in between.

DETAILED DESCRIPTION OF THE INVENTION

Figure 1:
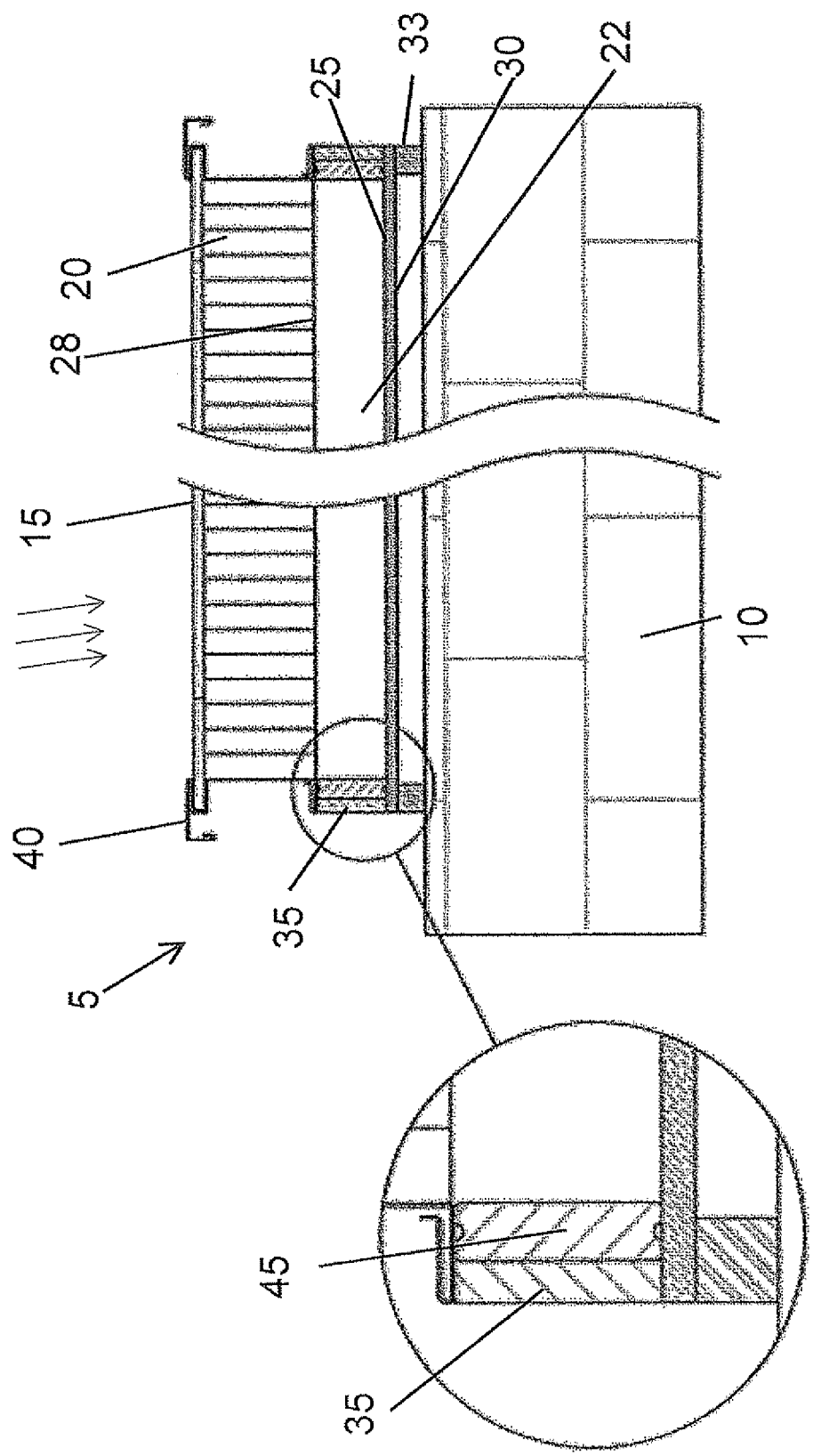
FIG. 1 is a schematic drawing of a solar energy module having stretchable sealing element which connects a thermally insulating element for transmitting solar radiation and an absorbing surface.

The present invention will now be described in terms of specific examples of embodiments. It is to be understood that the invention is not limited to the example embodiments disclosed. It should also be understood that not every feature of the methods and systems handling the described system is necessary to implement the invention as claimed in any particular one of the appended claims. Various elements and features of the system are described to fully enable the invention. It should also be understood that throughout this disclosure, where a method is shown or described, the steps of the method may be performed in any order or simultaneously, unless it is clear from the context that one step depends on another being performed first.

Before explaining several embodiments of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Unless otherwise defined, all technical and scientific terms used herein have the same meaning as commonly understood by one of ordinary skill in the art to which this invention belongs. The systems, methods, and examples provided herein are illustrative only and not intended to be limiting.

In the description and claims of the present application, each of the verbs "comprise", "include" and "have", and conjugates thereof, are used to indicate that the object or objects of the verb are not necessarily a complete listing of members, components, elements or parts of the subject or subjects of the verb.

Figure 2:
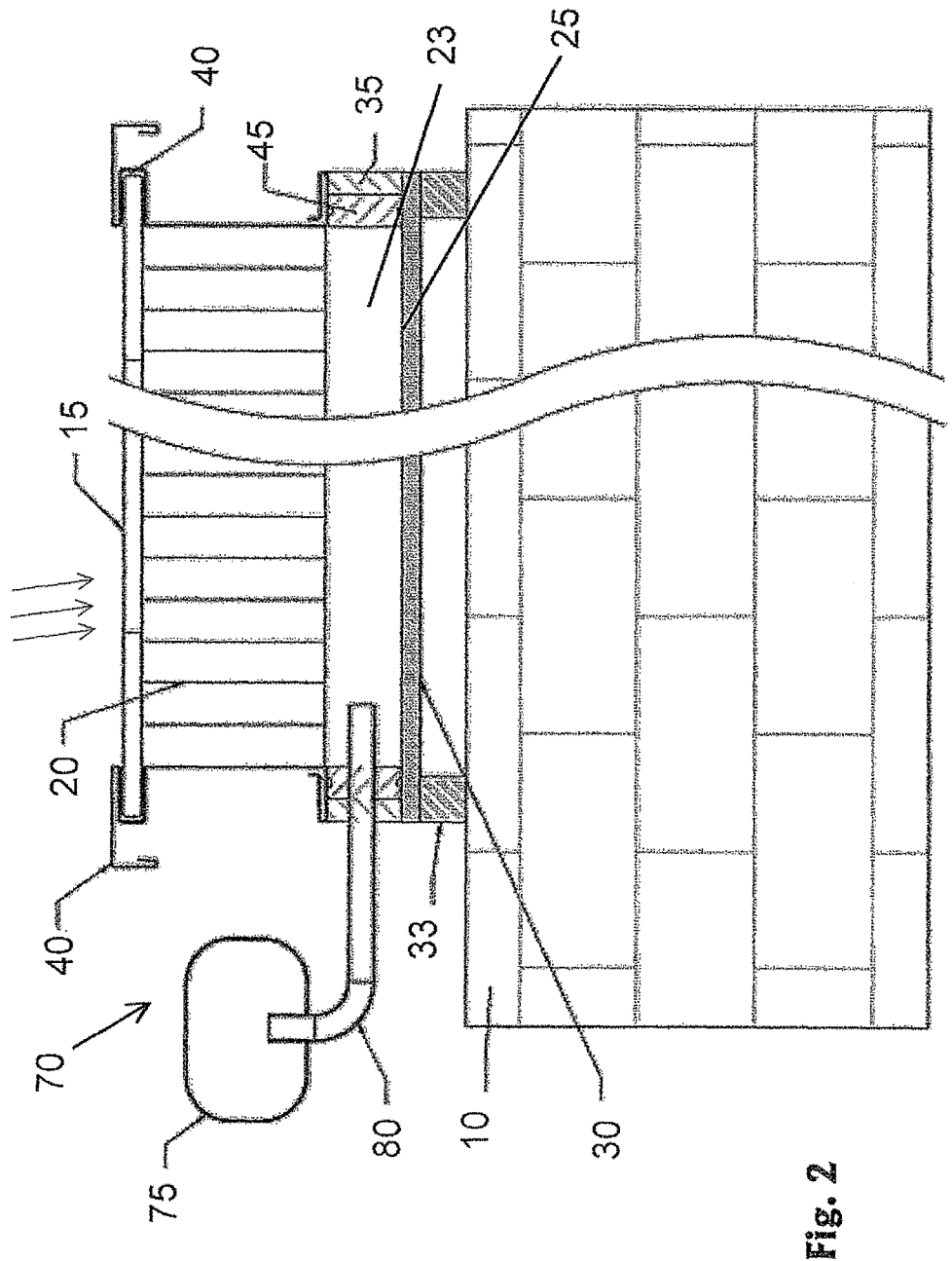
Figure 3:
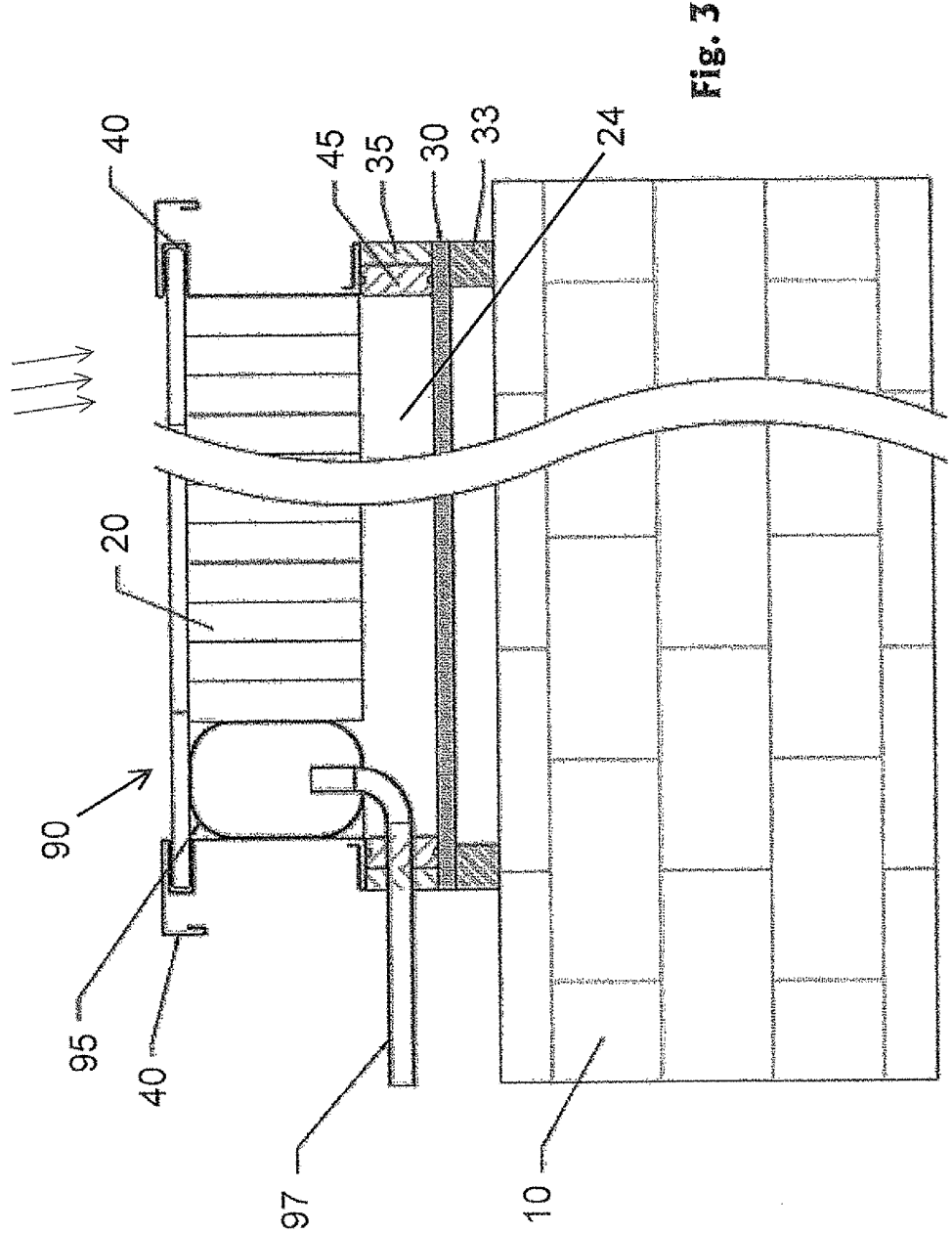
FIG. 3 is schematic drawing of a solar energy module having a flexible compartment with a free venting outlet within a sealed gas enclosure.
Figure 4:
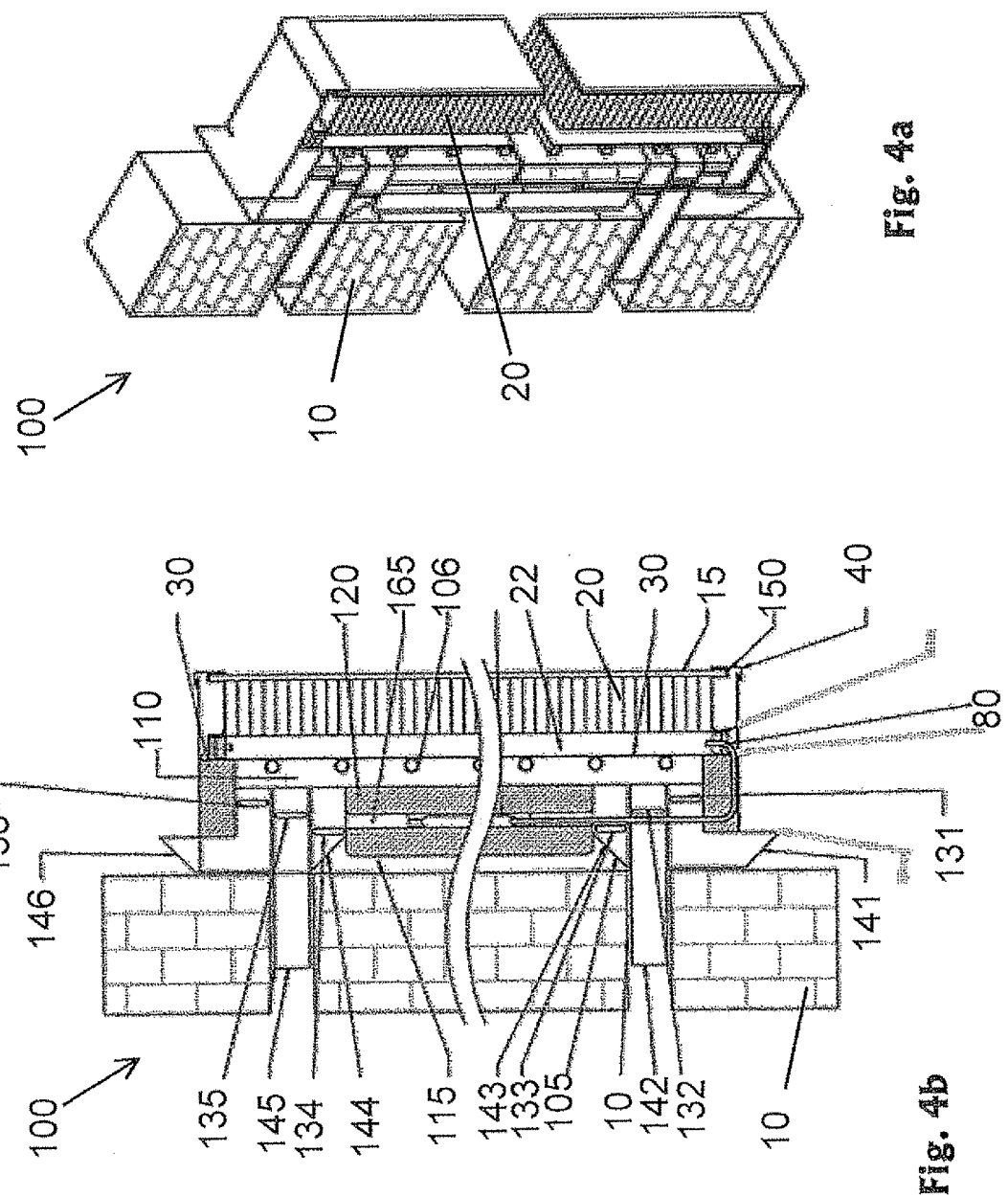
FIG. 4a is an isometric view of a solar energy module having a thermally coupled air duct
FIG. 4b is a sectional view of a solar energy module having a thermally coupled air duct
Figure 5:
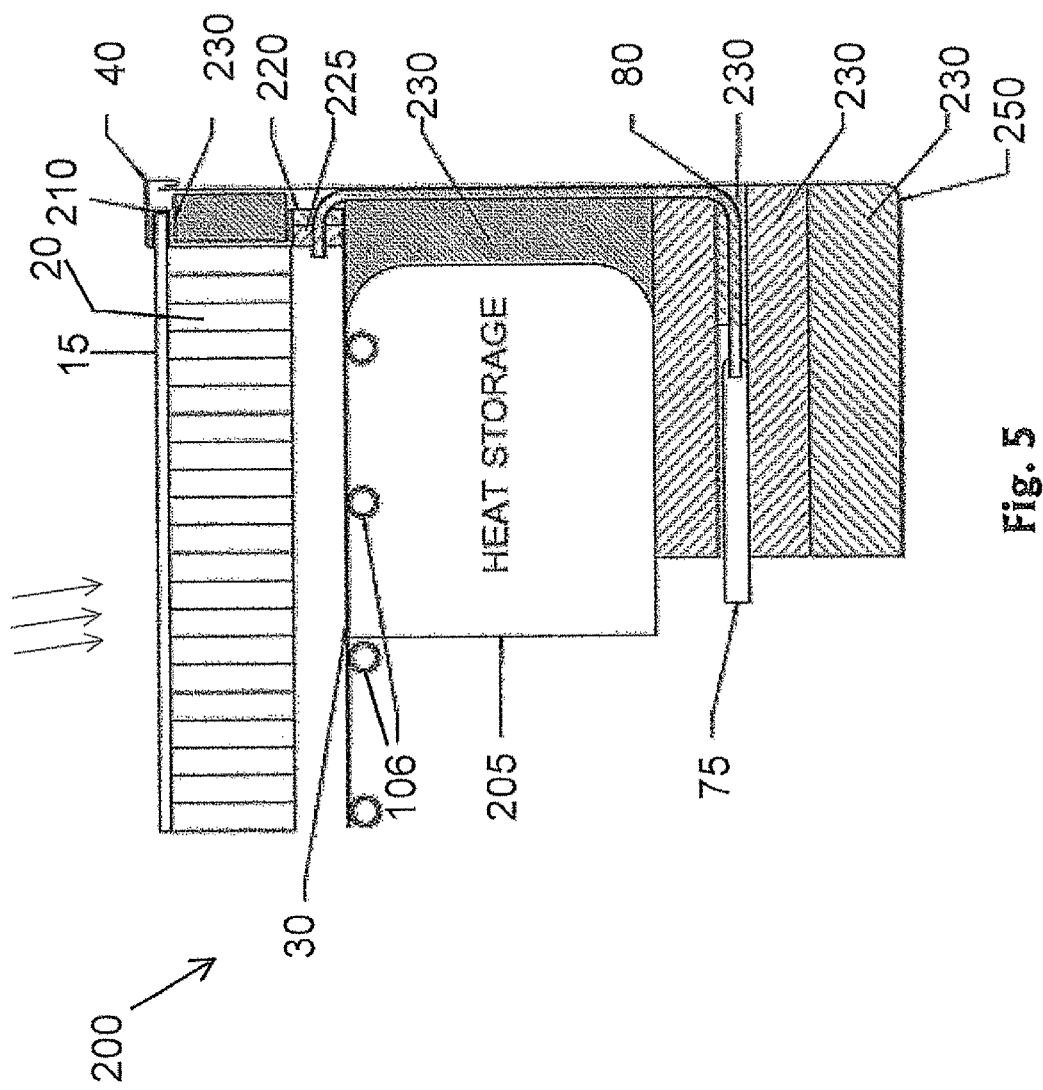
FIG. 5 illustrates a solar energy module having a heat storage thermally coupled to an absorbing surface.
Figure 6:
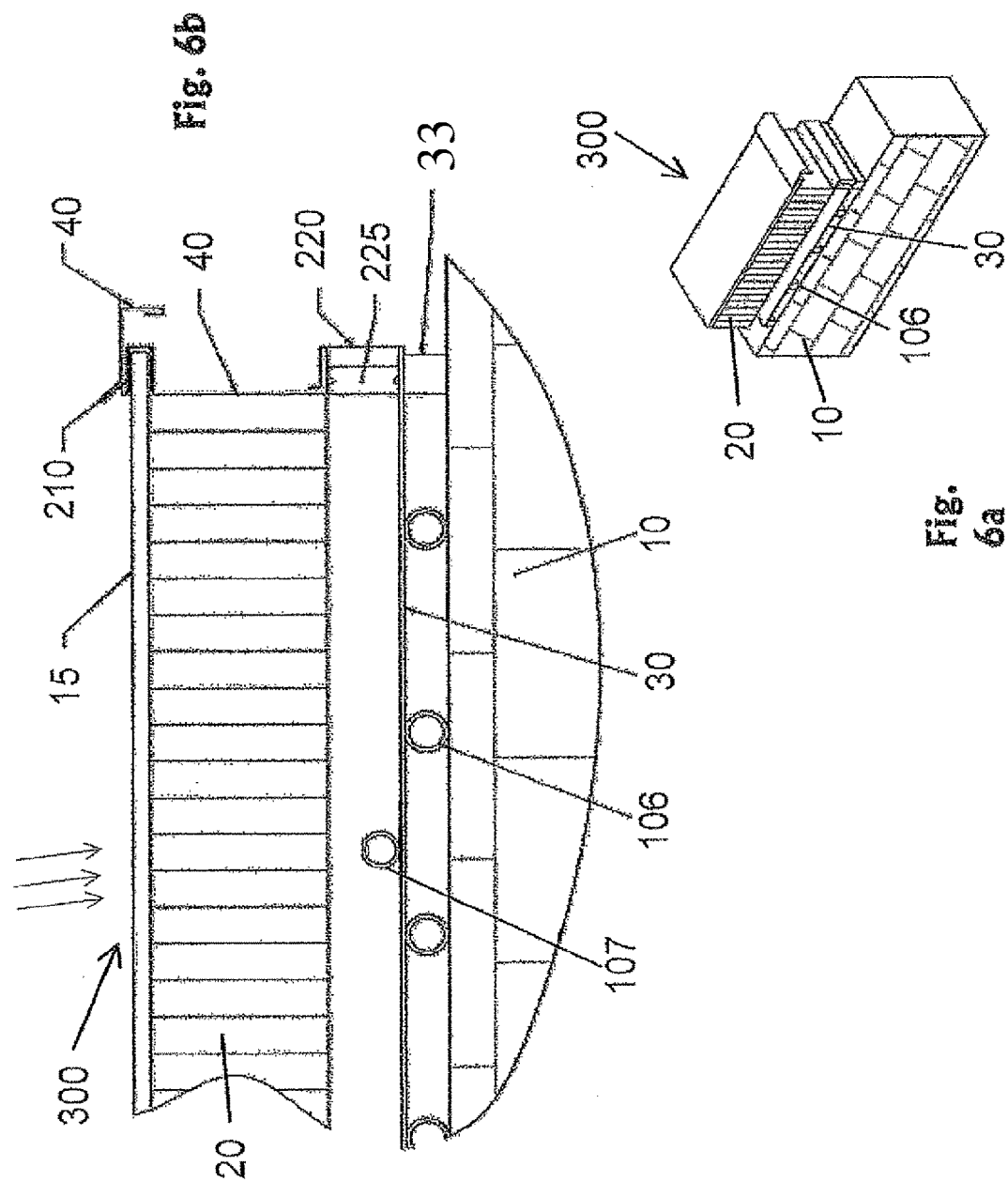
FIG. 6a is an isometric view of a solar energy module thermally coupled to a wall.
FIG. 6b is sectional view of a solar energy module thermally coupled to a wall.

Solar Modules Having a Sealed Gas Enclosure With a Variable Portion (FIGS. 1-3)

Three solar energy modules for converting solar light to thermal energy are described in FIGS. 1-3. Schematic drawing of module 5 is shown in FIG. 1. Solar radiation approaches solar module 5, which is disposed on a roof or on a wall 10. The solar radiation penetrates a low iron glass plate 15, a thermally insulating panel 20, enters gas volume enclosed in seal enclosure 22 and impinges a low-emission glass plate 25 and an absorbing plate 30. Absorbing plate 30 may in turn transfer the accumulated heat to other elements, like water pipes, heat reservoir and air duct, as elaborated below. Low-emission (low-E) glass plate 25 has low infra-red emissivity, and is used to reduce the radiative losses in the infra-red wavelength range to the outside environment. A commercial example of low-E glass is Pilkington K Glass™. Absorbing plate 30 is kept slightly off wall 10 by spacer 33.

Absorbing plate 30 may be made of a dark opaque substance, such as a selectively coated metal, known in the solar energy community for many years.

Thermally insulating panel 20 is transmissive to solar radiation, while having low transmissivity to thermal infra-red radiation. Preferably, layer 20 includes structural components as disclosed in U.S. Pat. Nos. 4,480,632, 4,719,902, 4,815,442, 4,928,665 and 5,167,217 all to Klier and Novik. Exemplary structural components are an insulation which includes several transparent enclosures, a layer of insulative beads disposed within an enclosure, and an array of elongated cells which is illustrated in FIG. 1. U.S. Pat. Nos. 4,480,632, 4,719,902, 4,815,442, 4,928,665 and 5,167,217 patents are incorporated by reference for all purposes as if fully set forth herein.

Thermally insulating panel 20, also called transparent insulation material or thermal diode may be a honeycomb made of synthetic material or glass which is transparent to solar IR and visible wavelengths, and opaque to thermal IR back-radiation, as a result of the optical properties of the material and its structure. At the same time, the transparent insulation material is a thermal convection suppressor because of its structure and a thermal conduction suppressor as a result of the thermal properties of the material and the thin walls of the honeycomb. This imbalance of the transparency to incoming solar radiation and the thermal-IR back-radiation and the restricted energy losses due to low convection and conduction create a thermal diode and enable the capturing and using of that captured heat for water heating.

Typical honeycomb material may be Polycarbonate (PC), Polymethyl methacrylate (PMMA, Cellulose triacetate (CTA), Glass or any other materials having similar optical and thermal conductivity properties. The honeycomb holes are facing the transparent cover 15.

Typical dimensions of such honeycomb are 3-12 mm. in diameter, or similar dimensions if the cross-section is not round, a wall thickness of 0.05-0.2 mm, and an aspect ratio of 3-15.

The use of thermal insulation panel 20 enables much greater energy conversion efficiencies over a much broader range of ambient temperatures and conditions, especially in colder climates. However, in order to extend the lifetime and guarantee the performance of solar module 5, it is necessary to seal it and isolate the internal components, such as transparent insulation panel 20 from the ambient atmosphere eliminating the risk of condensation or residual chemical contamination. Sealed enclosure 22 also enables replacement of the ambient gas within the unit with a medium of superior thermal characteristics, lower conduction and convection, such as Argon or Krypton. The sealing of panel 20 however, creates new challenges, related to pressure build up and the risk of catastrophic breakdown of enclosure 22. This risk is exacerbated by the increased volume of the solar panel due to the inclusion of transparent insulating panel 20, together with the wider range of temperature fluctuation enabled by the transparent insulation.

Sealed enclosure 22 is thermally coupled to absorbing panel 30, and has a variable portion in its envelope. This portion is adapted for varying the volume available to gas enclosed in enclosure 22. In the embodiment of FIG. 1, the variable portion is a stretchable sealing element 35 connecting thermally insulating panel 20, through profile 40, and absorbing plate 30. As stretchable sealing element stretches, the distance between thermally insulating panel 20 and absorbing plate 30 increases, thereby increasing the available volume for the enclosed gas. Absorbing plate 30 is kept slightly off wall 10 by spacer 33.

In some embodiments, as illustrated in FIG. 1 where thermally insulating panel 20 is made of elongated cells, a Teflon layer 28 is disposed over the cells. Layer 28 enables expansion of the volume available for the enclosed gas, as a pressure difference between the two sides of said flexible transparent layer stretches layer 28 locally and reduces the pressure difference. Teflon is a flexible but vapor impermeable barrier with a broad range of operating temperatures. Furthermore, if it is sufficiently thin, it is highly transparent in the solar wavelength range.

Referring now to a solar module 70 illustrated in FIG. 2, the sealed gas enclosure includes a fixed volume element 23, an expandable compartment 75, and a connecting duct 80 in between. Fixed volume element 23 is bounded by panel 20 or low iron glass plate 15, by low E-glass plate 15 and by spacer 45. Upon heating of the gas enclosed in fixed volume element 23, gas flows from fixed volume element 23 to the expandable compartment 75, keeping pressure of enclosed gas within structurally tolerable limits.

Referring now to solar module 90 of FIG. 3, a flexible compartment 95 having a free venting outlet 95 is enclosed within sealed gas enclosure 24 such that the external envelope of the flexible compartment 95 is a variable portion of the internal envelope of the sealed gas enclosure 24. Upon warming up of the enclosed gas, gas pressure increases and induces reduction of the volume enclosed by the flexible compartment 95. Thus, gas emits out of flexible compartment 95 through venting outlet 97, increasing the available volume for the enclosed gas and keeping gas pressure within structurally tolerable limits, and can in principle enable pressure equilibration with the external environment.

Solar Modules Having Heating Means (FIGS. 4-9)

A solar energy module 100 for converting solar light to thermal energy is illustrated in the isometric view of FIG. 4a and in the sectional view of FIG. 4b. Module 100 includes a thermally insulating element 20 transmissive to solar radiation and having low transmissivity to thermal infra-red radiation, an absorbing surface 30 for absorbing the solar radiation, water pipes 106 thermally coupled to absorbing surface 30, and an heating air duct 110 in direct thermal contact with absorbing surface 30 and with water pipes 106.

Solar radiation penetrates thermally insulating element 20 and is absorbed by absorbing surface 30, which in turn heats water within water pipes 106, as well as air flowing in heating air duct 110. The heated water and the heated air are usable for a variety of thermal applications, as described below.

Behind heating air duct 110 there is another interconnected air duct, the heat transfer duct 115 with insulation material 120 between duct 110 and duct 115. Heat transfer duct 115 may be either a metal duct or just a cavity between module 100 and wall 10. The circumference between wall 10 and module 100 is sealed to prevent heated air leakage.

Six air valves, 131,132,133,134,135 and 136 control heated air flow in ducts 110 and 115, wherein air flows through air vents 141,142,143,144,145 and 146 whenever the respective air valve is open.

In other modes, heating duct 110 may be opened either to the outer world, or to heat transfer duct 115, or towards the internal side of the building, or blocking the air passage totally. The solar thermal energy captured by module 100 may be transferred alternatively or simultaneously to several heat recipients. Also, heating duct 110 acts as a natural chimney if air valves 131 and 136 at the bottom and top parts of module 100 respectively are open, such that hot air exits air vent 146 by natural upward draft, pumping fresh air through air vent 141. In this collector shutdown mode, collector 30 is cooled down, preventing overheating when energy is not needed.

In space heating mode by air circulation, air valves 135 and 132 are open to rooms inside the building and all other air valves are closed. Consequently, hot air from air duct 110 enters rooms through air vent 145, and is replaced by colder air from the rooms that enters air duct 110 through air vent 142. Alternatively, in space heating mode by fresh air, valves 131 and 135 are open and all other valves closed. Also, air may be extracted from the room using air duct 110 as a natural exhaust by opening valves 132 and 136 and keeping all other valves closed.

In water heating mode, heat from the collector plate 30 is transferred by the heated water flowing in the pipes to other end user, such as space heating back rooms or hot water for sanitary use. This may be done simultaneously with direct air and/or space heating.

If only water heating is needed at any given time, either one of the following modes may be selected. In water heating only mode, all valves are closed such that the air in duct 110 is trapped, improving the thermal insulation and improving the efficiency of collector plate 30 and water pipes 106 as water heating means. In wall heating mode, valves 133 and 134 are open while all other air valves are kept closed. Consequently, heating duct 110 and heat transfer duct 115 are connected and hot air is circulated in the two ducts by natural thermal siphoning and thus thermal energy is transferred from hot collector plate 30 to wall 10 adjacent to heat transfer duct 115. Wall 10 serves as a thermal heat storage, transferring heat to the room by thermal conduction.

In passive insulation mode, applied whenever there is no solar radiation, all valves are closed and module 100 acts as a passive thermal insulator, preventing heat leakage outside the building.

Water pipes 106 may be used in several ways. A solar module 200 of FIG. 5 includes a heat storage 205 in thermal contact with absorbing surface 30 and water pipes 106. Heat storage 205 may be a container filled with water or any other heat retaining fluid. Water heated by solar radiation flows through water pipes 106, and heats up the water in heat storage 205. Later on, heated water from heat storage or reservoir 205 flow through water pipes 106, transporting the thermal energy stored in heat storage 205 to end-user, like domestic or industrial application.

The back side of heat storage 205 is thermally insulated from the external side of the building by an opaque insulation 230 made of poly urethane, mineral wool or any other insulating material. Also cover 250 and sealing compounds 220 and 210 improve the insulation, and thus, heat storage 205 is kept from freezing in colder climates.

Referring now to the isometric view of FIG. 6a and to the sectional view of FIG. 6b, module 300 illustrates heating a wall 10 by water pipes 106 which have thermal contact with absorbing panel 30 in one side and thermal contact with wall 10, on the other hand. Wall 10, in turn, transfers heat to the other side of wall 10, to the building interior. Note also that water pipe 107 is absorbing solar light directly and the heated water may be used for any application as done by water pipes 106.

Figure 7:
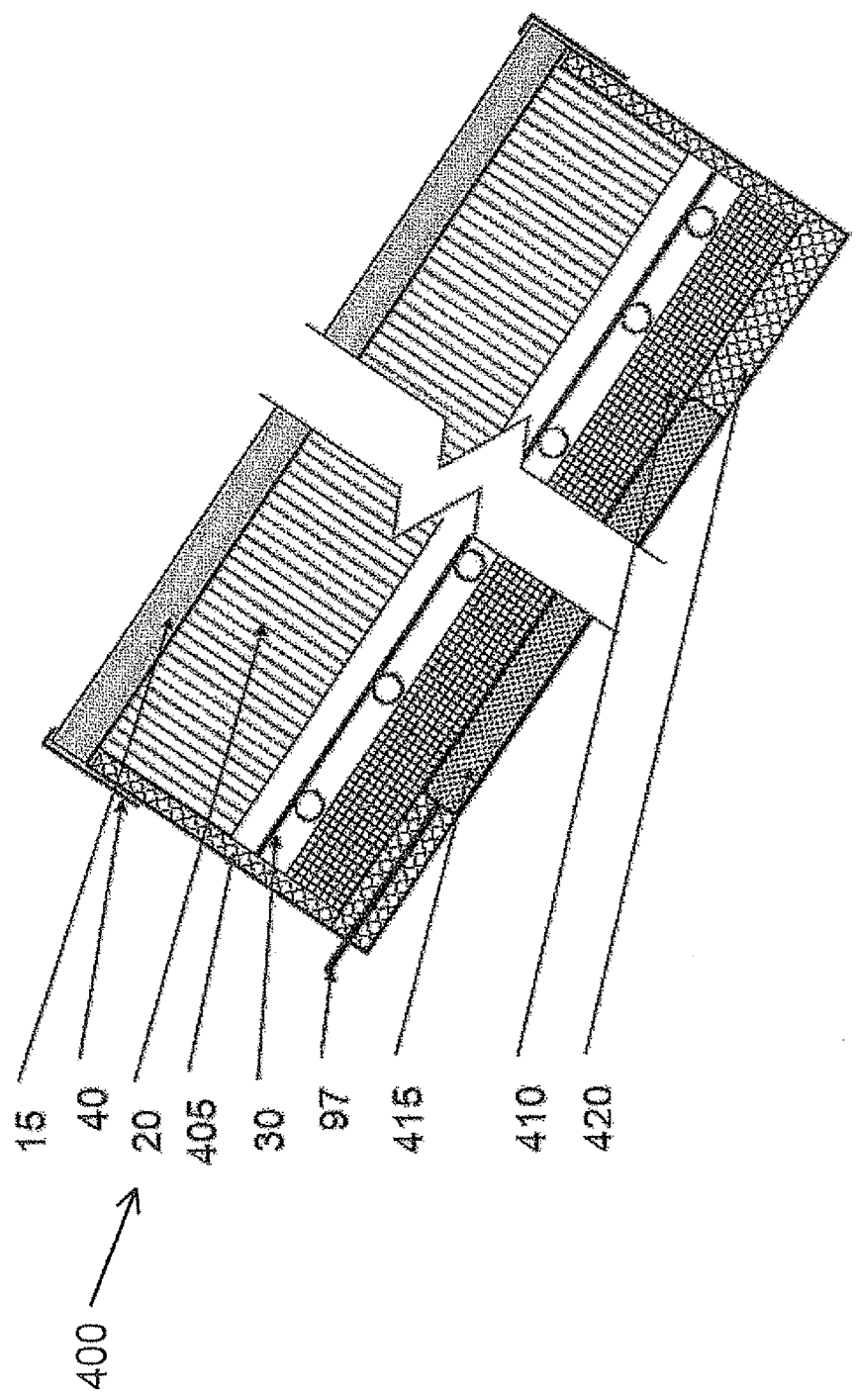
FIG. 7 is a sectional view of a solar module having an expansion aluminum bag for comparing the pressure of the enclosed gas to the external pressure.

Solar module 400 is presented in FIG. 7. The module is thermally insulated laterally by thermal insulation 405, and on the side of water pipes 106 by thermal insulation layers 410 and 420. In between insulation layers 410 and 420, an expansion aluminum bag 415 is disposed. Bag 415 is open to the ambient atmosphere through a connecting venting pipe 97. Thus, bag 415 shrinks and expands such that the enclosed gas is kept at atmospheric pressure, preventing breakage of solar module 400 due to pressure difference between enclosed gas and the atmosphere.

Figure 8:
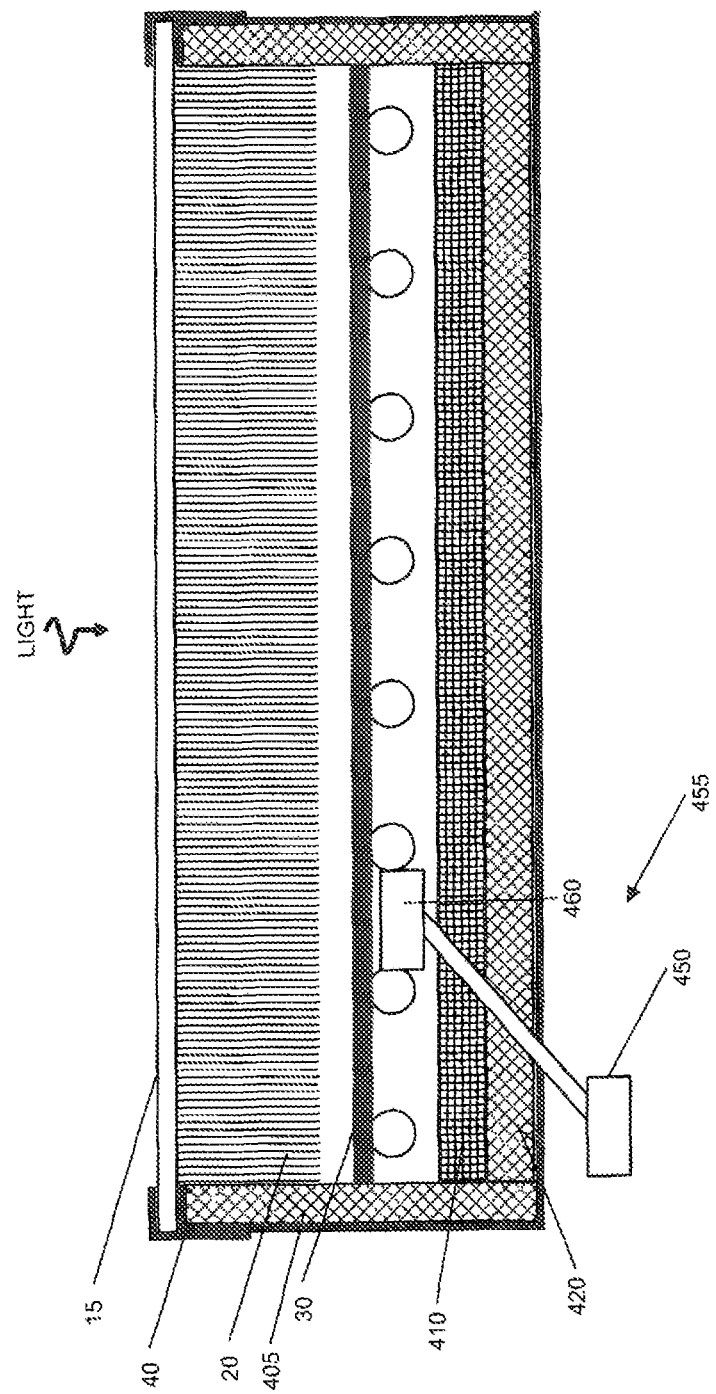
FIG. 8 is a schematic drawing of a solar module having means for transferring heat by liquid phase change.
Figure 9:
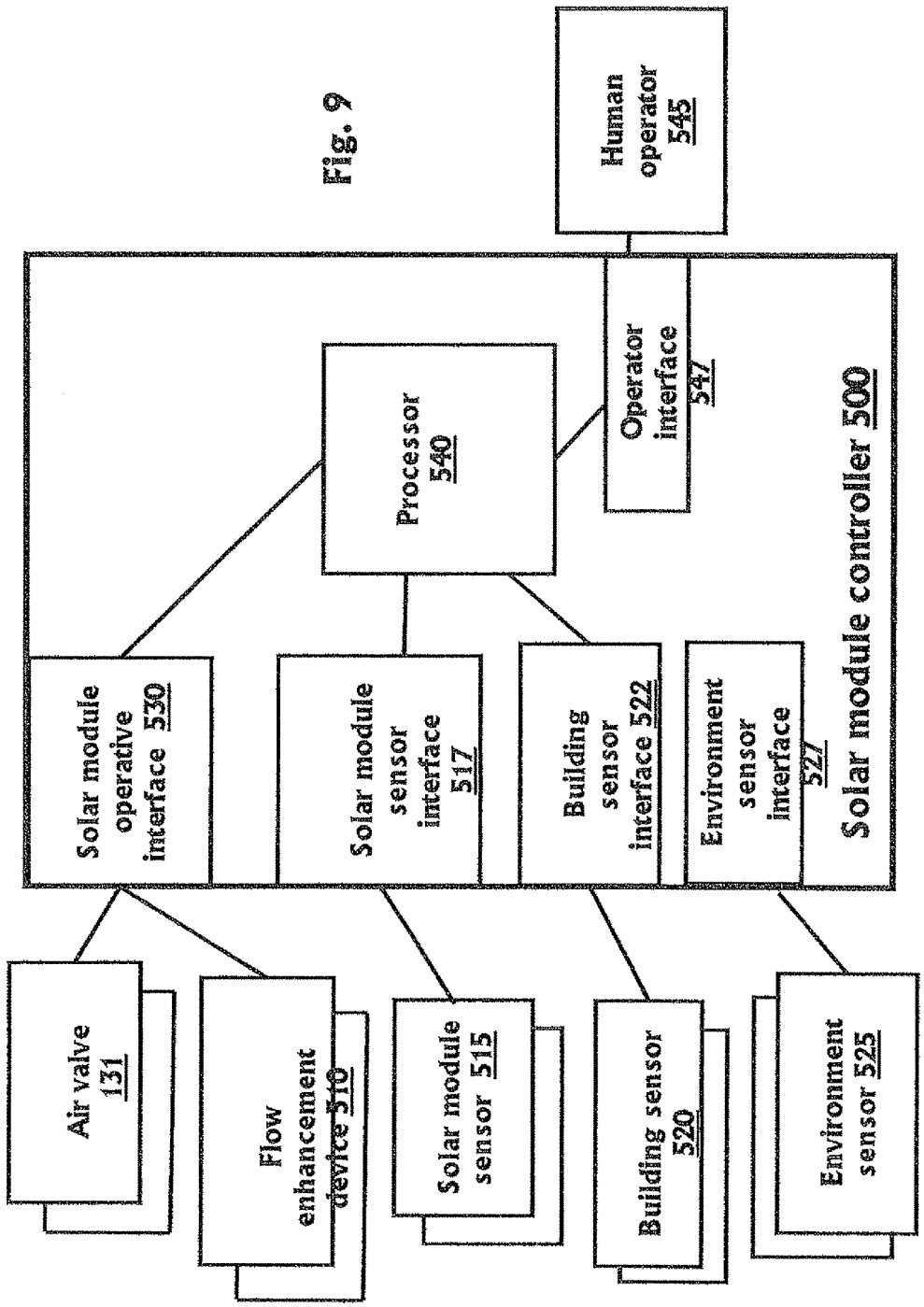
FIG. 9 is a block diagram of a solar module controller connected to a variety of sensors, to air valves and to a human operator.

The water pipes may be replaced or augmented by a heat pipe as the method of heat transfer from the interior to the exterior of the enclosure, as illustrated in the schematic drawing of FIG. 8. As is known in the art, a heat pipe 455 consists of a sealed pipe or tube made of a material with high thermal conductivity such as copper or aluminum at both hot and cold ends. A heat pipe vaporization volume 460 is filled to a predetermined pressure with a fluid such as water or ethanol which will be partially in the liquid phase and partially in the gas phase. Heat is transferred by the heat pipe 455 to a heat pipe condensation bulb 450 which is external to the solar module, whereas the heat is released to a local application as the latent heat of the liquid condensation. Other phase change materials may also be used in similar architectures.

The embodiments of FIGS. 4-8 include several heating means, air duct 110, water pipes 106, and heat reservoir 205, whereas other heating means may be available as well. On the other hand, a building and its residents need energy for a variety of applications, sanitary use, hot air ventilation, floor heating, back room heating, air-conditioning, etc. To match the available heating means with the desirable applications, a solar module controller 500 is used as illustrated in the block diagram of FIG. 9. Controller 500 receives data from a plurality of sensors, a solar module sensors 515 measuring temperature at various locations inside module 100, and measuring solar radiation power impinging solar module 100, building temperature sensors 520, measuring temperature at rooms and halls of the building, and environment sensors 525, measuring ambient temperature, and wind velocity. Processor 540 installs the available data in an optimization program having also a priority list of desirable heating objectives. Then, processor 540 designs an appropriate flow pattern, or heating plan, for the heating means, and issues corresponding commands for air valves 131,141, 142,143, 145 and 146, as well as to other flow enhancement devices 510 such as pumps for control of hot water from water pipes 106 and from heat storage 205.

In some embodiments, controller 500 is controlled by a human operator 545 through an operator interface 547.

In some embodiments, controller 500 includes several interfaces, 530,517,522 and 527 for interfacing respectively with air valves 131-136, flow enhancement devices 510, solar module sensors 515, building sensors 520, and environment sensors 525.

Figure 10:
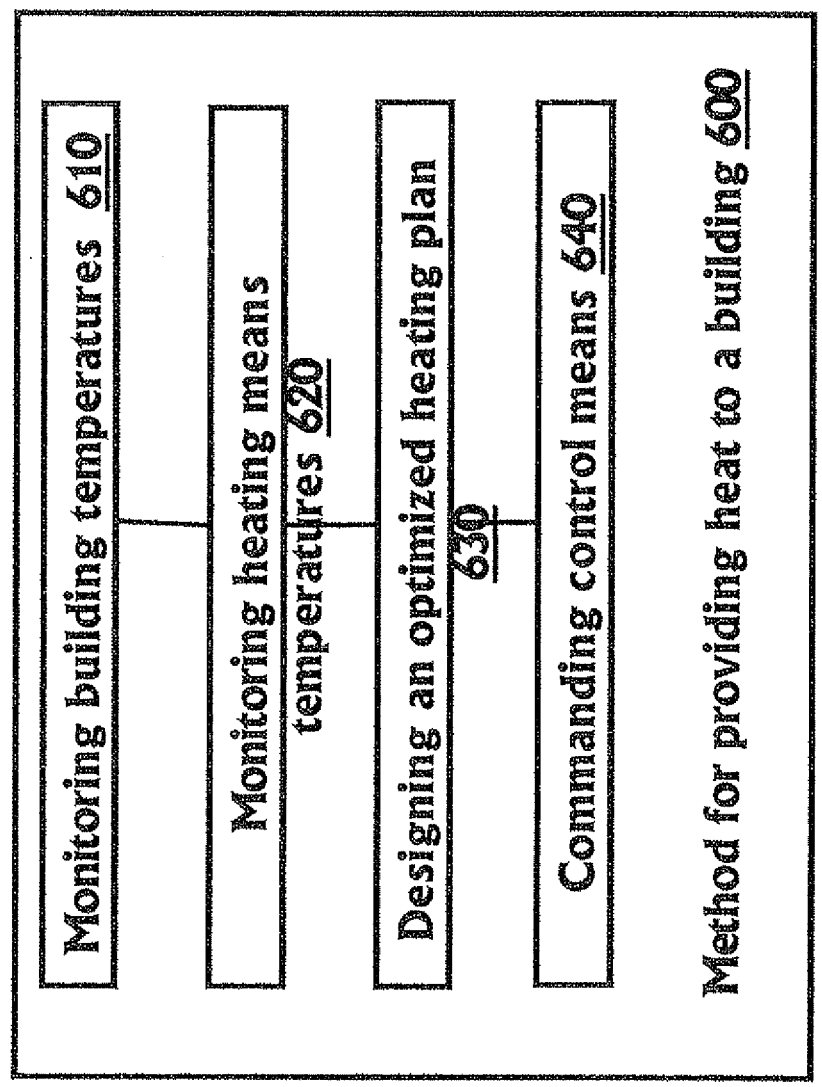
FIG. 10 is a flow chart of a method for providing heat to a building.

A Method Embodiment for Controlling Solar Modules (FIG. 10)

Referring now to FIG. 10, it illustrates a flow chart of a method 600 for providing heat to a building using hot air and hot water from solar energy modules 100, which provide heat to several heating means. The heating means include air duct 110 and heat reservoir 205. The flow of heat from the heating means is regulated by one or more control means 131-136 and 510. Method 600 includes a step 610 of monitoring temperature in locations within the building, and a step 620 of monitoring temperature of the heating means. Method 600 also includes a step 630 of designating a heating plan in accordance with monitored temperatures and in accordance with heat optimization targets, and a step 640 of commanding the control means for application of the heating plan.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. In particular, the present invention is not limited in any way by the examples described.

The invention claimed is:

1. A solar energy module for converting solar radiation to thermal energy, the module comprising:
   (a) a glass plate;
   (b) a transparent insulation;
   (c) a sealed enclosure having a fixed volume available to an enclosed gas inside said sealed enclosure said sealed enclosure having a duct fluidly connecting said fixed volume with a variable volume vessel outside said sealed enclosure, said variable volume vessel is for varying a volume available to said enclosed gas, said volume varying in accordance with changing temperature of said enclosed gas;
   (d) an absorbing element configured to absorb the solar radiation transmitted via said glass plate then via said transparent insulation, said absorbing element inside said sealed enclosure, said absorbing element in thermal contact with said enclosed gas;
   (e) at least one liquid pipe thermally coupled to said absorbing element; and (f) at least one heat pipe, wherein a vaporization volume of said heat pipe is inside said sealed enclosure and is thermally coupled to said absorbing element and wherein a condensation bulb of said heat pipe is external to the solar energy module, said transparent insulation including thermal convection suppression, suppressing convective heat transfer between said glass plate and said absorbing element, thereby the solar radiation penetrates said glass plate, then penetrates said transparent insulation and is absorbed by said absorbing element, said enclosed gas is heated in said fixed volume, said enclosed gas flows from said fixed volume via said duct to said variable volume vessel, said variable volume vessel varies to increase said volume available to said enclosed gas inside said sealed enclosure, thus keeping a pressure of said enclosed gas within structurally tolerable limits of the solar energy module.

2. The solar energy module of claim 1 wherein said pressure in said sealed enclosure is kept in substantial equilibrium with external environment pressure.

3. The solar energy module of claim 1 wherein said transparent insulation includes at least one structural component having high transmissivity to solar radiation, the component selected from the group consisting of:
(i) an insulation comprising a plurality of transparent enclosures;
(ii) a layer of insulative beads disposed within an enclosure; and
(iii) an array of elongated cells.

4. The solar energy module of claim 1 wherein said transparent insulation includes elongated cells and a flexible transparent layer is disposed over the cells wherein a pressure difference between the two sides of said flexible transparent layer stretches the layer locally and reduces the pressure difference.

5. The solar energy module of claim 1 wherein said transparent insulation has low transmissivity to thermal infra-red radiation.

6. The solar energy module of claim 1 wherein said absorbing element has low emissivity to thermal infra-red radiation.

\* \* \* \* \*